United States Patent [19]

Park

[11] Patent Number: 4,628,782
[45] Date of Patent: Dec. 16, 1986

[54] POWER TOOL GUIDE-CLAMP ASSEMBLY

[76] Inventor: Robert A. Park, 3717 Edinburgh Dr., Virginia Beach, Va. 23452

[21] Appl. No.: 689,208

[22] Filed: Jan. 7, 1985

[51] Int. Cl.[4] ............................................. B27B 27/02
[52] U.S. Cl. ..................... 83/442; 83/477.2; 83/648
[58] Field of Search ................. 83/415, 409, 412, 422, 83/418, 745, 442, 454, 648, 167, 444, 452, 409.2, 413, 484, 477.2; 269/249, 221, 152, 154

[56] References Cited

U.S. PATENT DOCUMENTS

| | | | |
|---|---|---|---|
| 726,403 | 4/1903 | Calhoun et al. | 83/415 |
| 1,038,215 | 9/1912 | Shaw | 83/418 |
| 1,917,926 | 7/1933 | Decker | 308/3 A |
| 2,655,959 | 10/1953 | Krueger et al. | 83/415 |
| 2,976,899 | 3/1961 | Lane | 143/47 |
| 3,011,530 | 12/1961 | Lamb | 83/74.5 |
| 3,587,680 | 6/1971 | Bishop, Jr. | 83/442 |
| 4,135,419 | 1/1979 | Chapin | 83/471.3 |
| 4,161,900 | 7/1979 | Mendelson | 83/477.2 |
| 4,164,882 | 8/1979 | Mericle | 83/745 |
| 4,292,870 | 10/1981 | Mericle | 83/477.2 |
| 4,367,668 | 1/1983 | Jensen | 83/415 |
| 4,481,846 | 11/1984 | Goodell | 83/477.2 |

Primary Examiner—Frank T. Yost
Assistant Examiner—Hien H. Phan
Attorney, Agent, or Firm—Griffin, Branigan & Butler

[57] ABSTRACT

A guide clamp (15, 80) has a channel shape which receives the first edge of a board and which forms a straight edge (31, 87) to be slid along a saw fence clamp (23) while cutting the board along a straight line (55, 56) with a table saw (11). A top arm (27, 82) of the channel includes clamping members (35, 89) which clamp the board in the guide clamp while a bottom arm (29, 83) of the channel supports the first edge of the board a fixed distance from a table surface (19) of the table saw. A separate shim (17, 96) is positioned between the opposite, or second edge of the board and the table surface to hold the second edge above the table surface said fixed distance so that the board remains level during cutting to make a true cut on the board.

14 Claims, 16 Drawing Figures

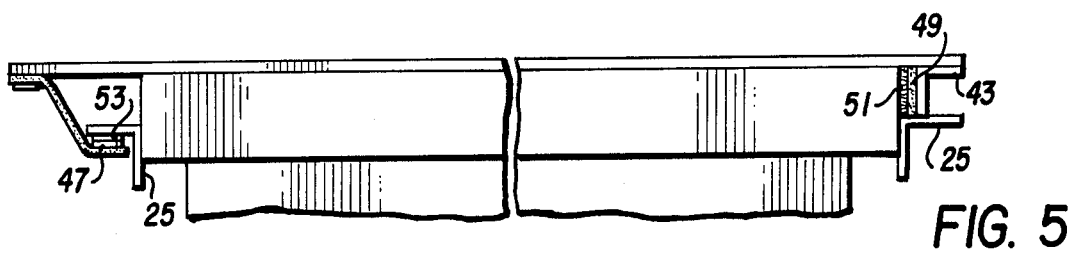
FIG. 5
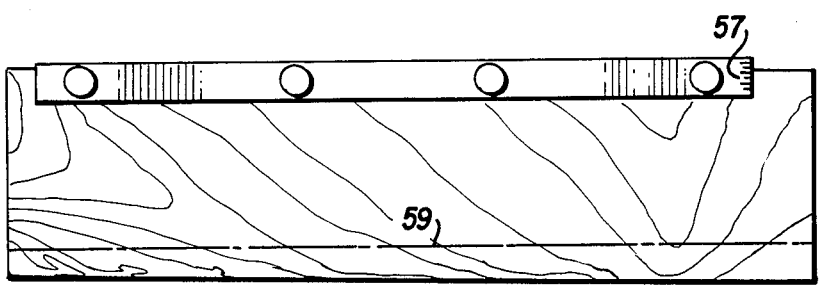
FIG. 6A
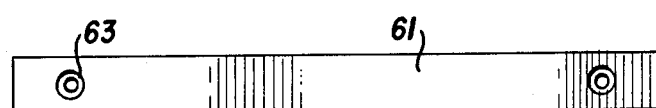
FIG. 7
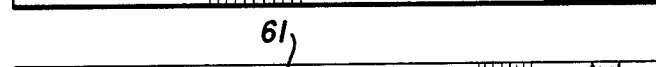
FIG. 8
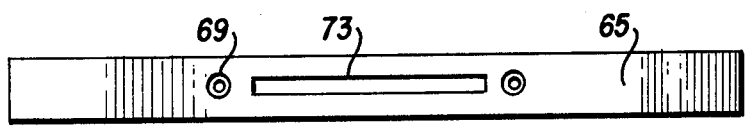
FIG. 9
FIG. 10
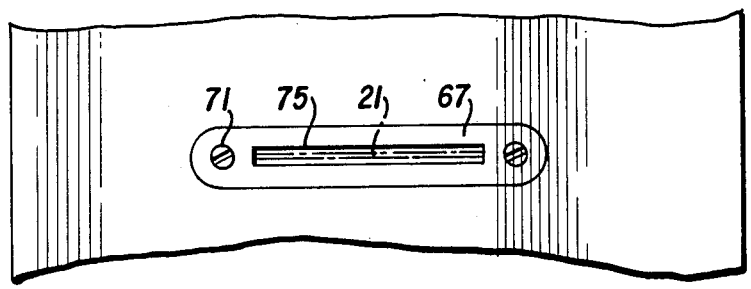
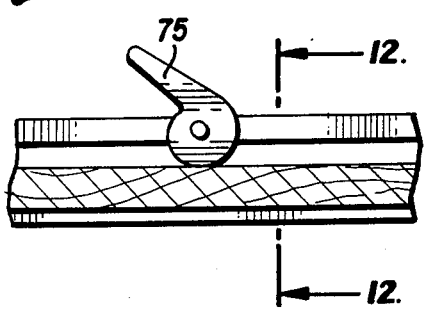
FIG. 11
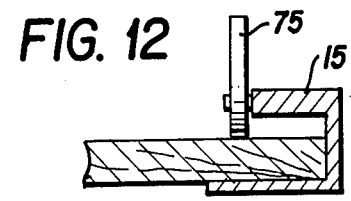
FIG. 12
FIG. 13
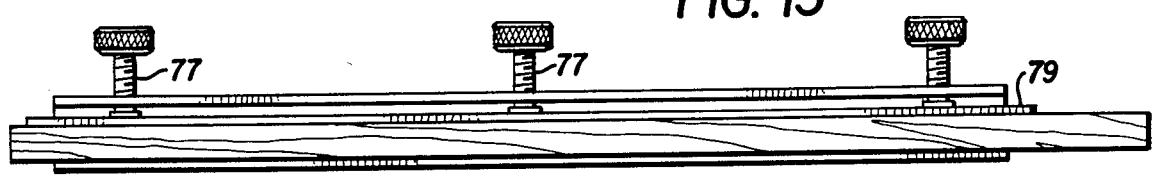

POWER TOOL GUIDE-CLAMP ASSEMBLY

BACKGROUND OF THE INVENTION

This invention relates broadly to power tools, and more specifically to accessories for table, power cutting tools such as table saws.

When performing wood carpentry work it is often necessary to establish a straight and true edge on warped boards or boards with an uneven edge by removing a minimal amount of material. In this regard, it is also often necessary to use a joiner and/or a planer along a cut edge, or along the edge of a board purchased from a saw mill, in order to make the edge truly straight, normal and flat in all respects so that it can be joined with a similar edge without creating gaps or to establish a straight (reference) edge for further cuts. Such processing often requires multiple joiner passes which unduly increases work and consumes time. Further, properly performing such cuts normally requires the posession of expensive machinery and therefore the investment of considerable money both for the machines themselves and for the space for storing and/or utilizing the machines. Many "do-it-yourselfers" often like to use old or scrap lumber in order to save money and would therefor like to be able to prepare such truly straight edges but would perfer not to have to invest in the tools normally necessary therefor. It is therefore an object of this invention to provide a relatively inexpensive accessory to be used with a power table saw or other similar table cutting tool which enables the table saw to make near perfect edge cuts which are sufficiently flat, straight and normal so that they can be joined with similar cuts without creating undue gaps therebetween.

It is also an object of this invention to provide a guide tool which can be used with a table saw and other power table cutting machines, to improve the use of the board itself as a guide for making cuts therein.

Another object of this invention is to provide a guide tool to be used by a carpenter which enables him to easily make angled lengthwise cuts on boards.

It was suggested in U.S. Pat. No. 3,587,680 to Bishop to use a straight-edge member attached to the edge of a board to form a guide for a saw to follow in cutting the board. However, in Bishop the straight-edge member is nailed to the board and this, of course, has the disadvantage that it leaves nail holes in the board. It is, therefore, yet another object of this invention to provide a straight edge to be attached to the edge of a board which thereby enables the board to serve as a guide but which does not mark, or in any way harm, the board.

Another object of this invention is to provide a guide edge clamp which is easy to use, inexpensive to purchase, but yet which is durable and accurate.

SUMMARY OF THE INVENTION

According to principles of this invention, a straight edge is clamped to a first edge of a board, while a separate shim is placed under the opposite, or second, edge of the board to hold the board level during a cut. The shim includes structure to portably retain it on the table surface of a table saw during a cut, but to allow it to be removed when the straight-edge clamp is not used.

BRIEF DESCRIPTION OF THE DRAWINGS

The foregoing and other objects, features and advantages of the invention will be apparent from the following more particular description of the preferred embodiment of the invention, as illustrated in the accompanying drawings in which reference characters refer to the same parts throughout the different views. The drawings are not necessarily to scale, emphasis instead being placed upon illustrating principles of the invention in a clear manner.

FIG. 5 is a simplified side-sectional view of a power saw table shim of FIG. 4 mounted thereon;

FIG. 6A is a plan view of a guide clamp of this invention mounted on a board illustrating a method of using the guide clamp for making angled cuts;

FIG. 7 is a plan view of an alternate-embodiment shim;

FIG. 8 is a side view of the alternate-embodiment shim of FIG. 7;

FIG. 9 is a plan view of another alternate-embodiment shim;

FIG. 10 is a plan view of a power saw table on which the alternate-embodiment shim of FIG. 9 is to be mounted;

FIG. 11 a sectional side view of an alternate-embodiment clamp having an alternate-embodiment clamping member holding a board therein;

FIG. 12 is a sectional view taken on line 12—12 of FIG. 11;

FIG. 13 is a segmented side view of an alternate-embodiment guide clamp of this invention;

DESCRIPTION OF THE PREFERRED EMBODIMENTS

Figure 1:
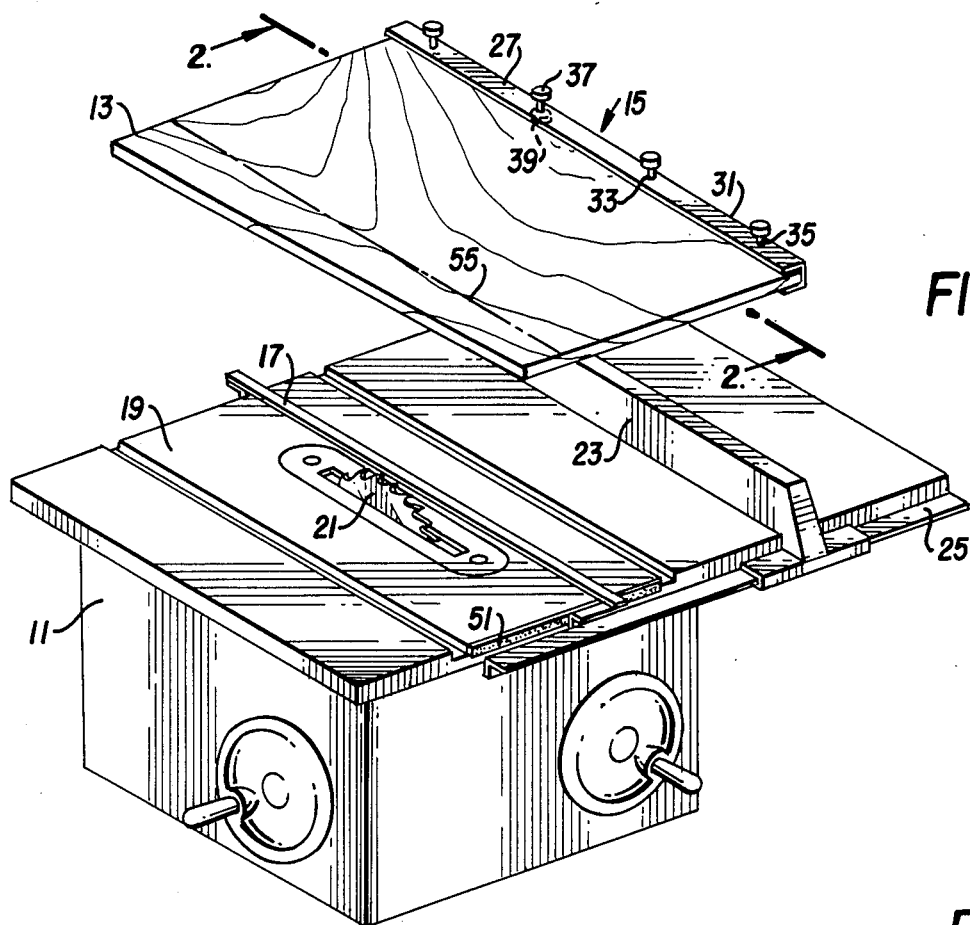
FIG. 1 is a isometric exploded view of a table saw and a board to be cut therewith on which a guide-clamp and shim of this invention are mounted.

FIG. 1 shows a table saw 11 and a board 13 to be cut therewith having mounted thereon a guide-clamp assembly of this invention including a guide clamp 15 and a shim 17.

The table saw 11 has a table surface 19, a fixed-position rotary blade 21, and a saw fence clamp 23. The saw fence clamp 23 is attached to a saw-fence-clamp angle and rule 25 at both sides of the table surface 19. As can be seen in FIG. 1, the saw-fence-clamp angle 25 is positioned on the table somewhat below the table surface 19, however, in utilizing this invention one must realize that there are numerous types of table saws and that this invention is only being described in relation to one such table saw.

Figure 2:
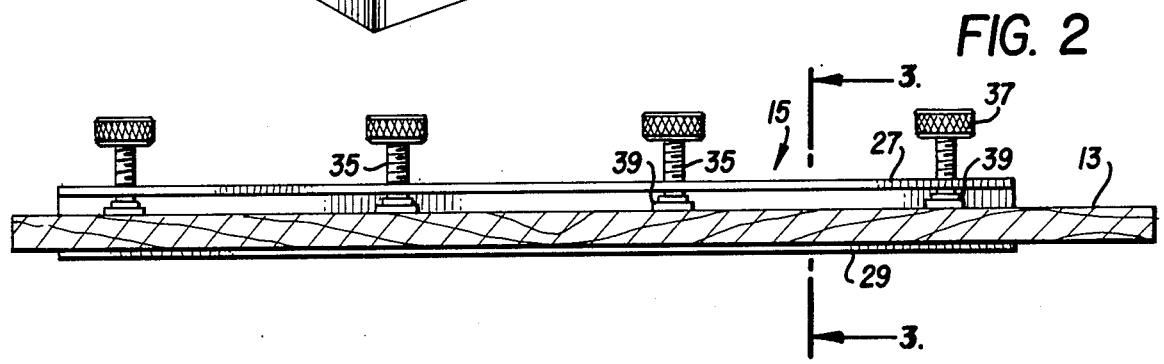
FIG. 2 is a cross-sectional view taken on line 2—2 in FIG. 1.
Figure 3:
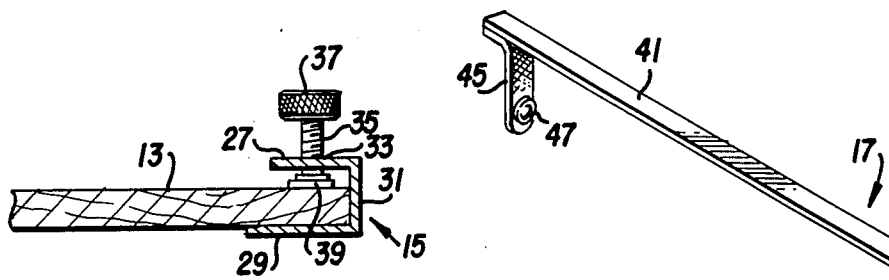
FIG. 3 is a cross-sectional view taken on line 3—3 in FIG. 2.

The guide clamp 15, as can be seen from various perspectives in FIGS. 1, 2, and 3, is channel, or U-shaped, in cross-section having a top arm 27, a bottom arm 29 and a straight edge 31 joining the top arm 27 and bottom arm 29 (see FIG. 3). The top arm 27 has threaded holes 33 therein spaced along its length for engagingly receiving threaded bolts 35. The bolts 35 have knobs 37 at their top ends which are fixedly attached to the threaded bolts 35. At their lower ends the bolts 35 have clamping pads 39 which are engaged to the bolts 35 to move longitudinally therewith, however, which are free to rotate relative to the bolts 35. Bolts 35 are located about every 1 to 2 feet along the linear guide clamp 15. The channel shape of the guide clamp 15 is such that it will receive a board 13 of normal thickness, that is, in a preferred embodiment, it will hold boards up to 1½ inches thick, however, alternative embodiments could hold boards with thicknesses up to the capacity of the saw minus the shim thickness.

Figure 4:
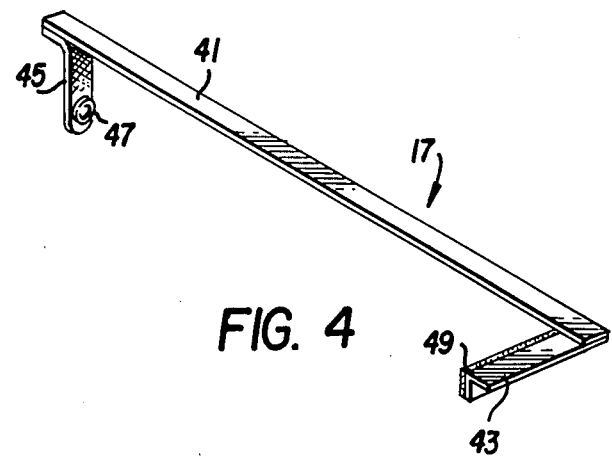
FIG. 4 is an isometric view of the shim of FIG. 1 by itself.

The shim assembly 17 is shown in greater detail in FIG. 4. An important feature of a shim member 41 is that its thickness is exactly the same as the thickness of the bottom arm 29 (⅛ inch in the preferred embodiment). Welded on the bottom side of one end of the shim member 41 is an angle iron 43 whose axis of elongation is perpendicular to the axis of elongation of the shim member 41. Attached to the bottom side of the other end of the shim member 41 by means of a screw and washer, is a flexible, cloth-like, band member 45 having "Velcro" 47 on the inside surface thereof. Similarly, matching "Velcro" 49 is adhered on the inside surface of the angle iron 43, as is shown in FIG. 5 and matching "Velcro" 51 and 53 is respectively adhered on the outside surface of the table saw 11 and on the bottom side of the saw-fence-clamp angle and rule 25 so that, when it is mounted on the table, the shim assembly 17 is engaged to the table to hold its position so as not to become involved with the blade 21.

In operation, the guide clamp 15 is clamped to the edge of a board 13 to be cut by placing the edge of the board between the channel arms 27 and 29 and tightening the board 13 against the bottom channel arm 29 of the clamp by rotating knobs 37, thereby forcing pads 39 against the board 13. If the cut is to be made parallel with one edge of the board, for example, along dashed line 55 in FIG. 1, that board edge is urged against the inside of the straight-edge member 31 of the clamp as is shown in FIG. 3 before the board is clamped into position. The shim 17 is placed on the saw table surface 19 so that it is positioned close to the rotary blade 21, however, it is held in this position by the "Velcro" 47, 49, 51 and 43. The shim angle iron 43 is placed against the edge of the table 19 from which the board will be fed into the blade 21. The shim angle iron 43 assures that the shim does not move with the board as the board is fed into the blade 21. The "Velcro" prevents lateral movement with regard to feeding the board into the blade, as the board is fed the straight edge 31 slides against the saw fence clamp 23, providing perfectly straight guidance inasmuch as both of these edges are near perfect. The clamped edge of the board is held from the table surface 19 a fixed distance determined by the thickness of the smooth, flat, bottom arm 29 and the opposite edge of the board is held from the table surface 19 by the smooth, flat, shim member 41, both of these thicknesses being equal to cause the board to be perfectly flat. The shim member 41 is sufficiently wide (¾ inch) that it will not dig into and thereby mar the board 13.

In the preferred embodiment the guide clamp is not less than two feet long, although preferably it is over three feet long.

Figure 6:
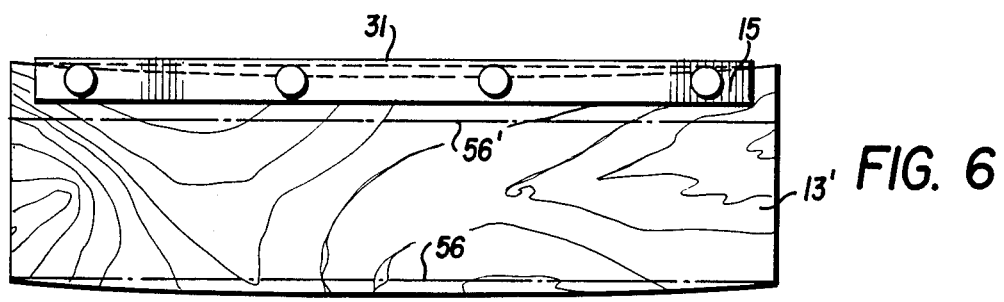
FIG. 6 is a plan view of a warped board in a guide clamp of this invention with imaginary, dashed, cut lines shown thereon for purposes of illustration.

It will be appreciated by those skilled in the art that a cut (56 in FIG. 6) made in the manner described on a warped board 13' will provide a near perfect edge which does not require trimming by a joiner in order to be properly joined with the edge of another board and in order to provide a reference edge for making further cuts 56' on the board 13'.

An additional advantage of this invention is shown in FIG. 6A in which it can be seen that the guide clamp 15 has scales 57 marked at one end thereof which, with the opposite end of the board being butted, allow one to clamp the board 13 in the guide clamp 15 on a predetermined angle so that an angle cut along a dashed line 59 can be easily made without the use of complicated and expensive tools.

In the preferred embodiment the guide clamp 15 is constructed of steel for strength while the shim 17 is constructed of aluminum or plastics, although other materials could also be used. The clamp can be constructed by modifying off-the-shelf channel irons.

FIGS. 7 and 8 depict an alternate shim embodiment in which a shim 61 has counter-sunk screw holes 63 which are aligned with threaded holes in the table surface 19. Of course, in order to use the shim of FIGS. 7 and 8, one must either tap his own threaded holes in the table surface 19 or must utilize threaded holes which already exist in the table surface 19.

FIGS. 9 and 10 depict yet another embodiment of this invention in which a shim 65 utilizes screw holes for a plate 67 which surrounds the blade 21. Of course, counter sunk bolt holes 69 correspond with counter sunk bolt holes 71 of the plate 67 and the shim 65 has a blade opening 73 to correspond with a blade opening 75 of the plate 67. The plate 67 is recessed into the table surface 19 when it is used, however, when the shim 65 is used, it rides on top of the table surface 19. In order to use the guide clamp assembly of this invention with the FIGS. 9 and 10 embodiment, one must simply replace existing screws for plate 67 with longer screws with which the shim 65 is held in place.

FIGS. 11 and 12 depict an alternate embodiment cam-type clamping member 75 which can be used to replace the bolt clamping members 33 shown in the FIGS. 1–3 embodiment. It would also be possible to further modify this embodiment whereby the cam clamping member 75 does not have a handle extending therefrom, but rather has a socket and is driven by a socket wrench, Allen wrench or the like. This arrangement has the benefit of providing overhead, vertical, clearance which some radial arm saws need. Many other clamping member arrangements could also be used.

With regard to other possible clamping member embodiments, FIG. 13 discloses an embodiment in which bolt clamping members 77 are commonly, rotatably engaged with only a single clamping pad 79.

Figure 14:
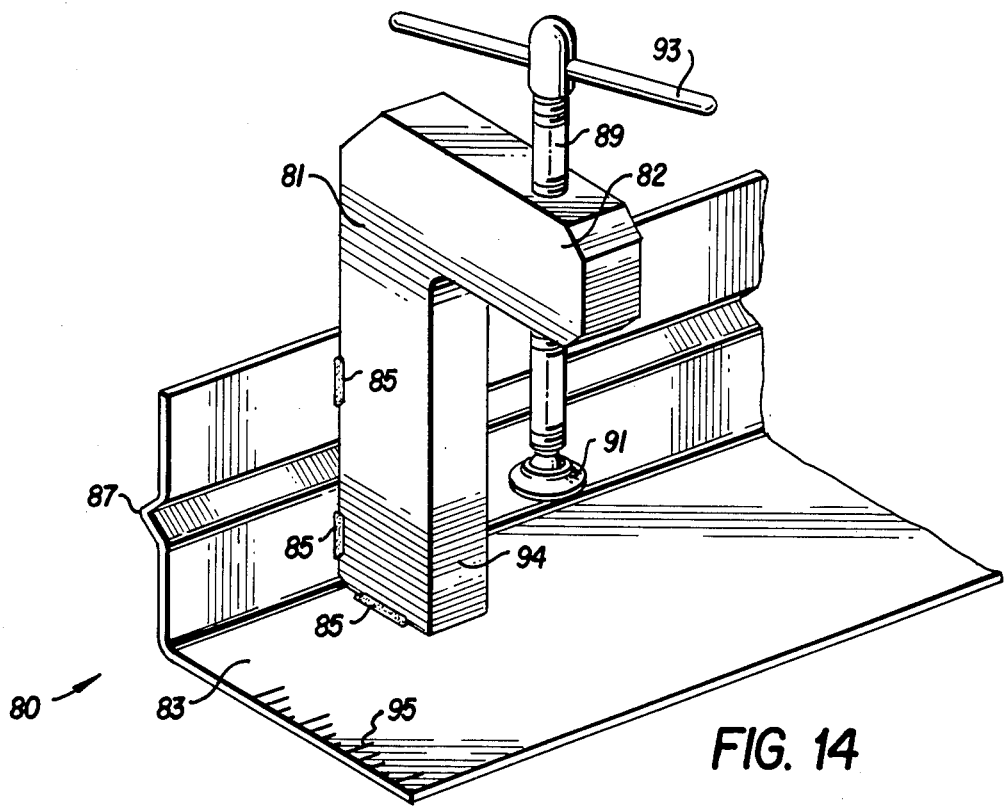
FIG. 14 is an isometric view of a preferred embodiment of a guide clamp of this invention; and, FIG. 15 is a side view of a preferred embodiment of a shim member of this invention.

FIG. 14 discloses a preferred guide clamp embodiment 80 in which 1 inch thick L-shaped clamping brackets 81 form top arm members 82 of the channel and an L-shaped angle iron 83 forms the bottom arm of the channel. These two members are tack welded together at 85, with one side of the angle iron 83 being bent at 87 for added strength and to provide a straight edge. A ½ inch bolt 89 with a pad 91 and a handle 93 is mounted in each L-shaped clamping bracket 81 to clamp the board therein. In this case the board is either shoved against the edges 94 of the clamping brackets 81 or it is placed on an angle using an index 95.

Figure 15:
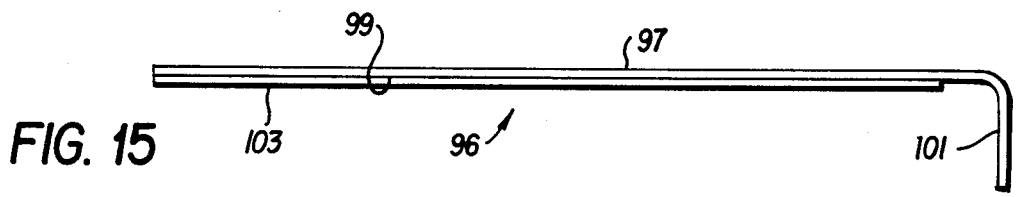

FIG. 15 depicts a preferred embodiment of the shim member 96. This embodiment is constructed of a molded piece of plastic or aluminum 97 having a flat horizontal section 99 and a 90° vertical section 101. Attached to the lower surface of the horizontal section 99 is a strip of magnetized plastic 103 which is held to the table surface 19 by magnetic attraction. The vertical section 101 serves as a stop and abuts the side edge of the table during use.

It will be appreciated by those skilled in the art that the guide clamp assembly of this invention provides an inexpensive tool which vastly improves the precision of a table saw and, in fact, allows a handyman to perform with a table saw many functions which ordinarily require other expensive, heavy, cumbersome and space-using tools. By using the straight edge 31 of the guide clamp 15 for guiding a board against the saw fence clamp 23, a carpenter is allowed to make a near perfect cut, the quality of the cut not depending on the guiding edge of the board as is normally the case.

While the invention has been particularly shown and described with reference to preferred embodiments, it will be understood by those skilled in the art that various changes in form and detail may be made therein without departing from the spirit and scope of the invention. For example, the invention could be configured differently to make it more universally applicable to table cutting tools or to make it fit a particular table cutting tool. Further, a product based on this invention could be sold as a kit with various components, some of which are used for some table cutting tools, and others of which are used for others. Further, such a product could contain instructions on how enclosed parts could be modified to fit various table tools. For example, a long shim member 41 could be sold with instructions about cutting it to fit a table and then mounting the band member 45 thereon. Modifiable self-adhesive "Velcro", or other fastening members, could be sold as part of the product.

The embodiment of the invention in which an exclusive property or privilige are claimed are defined as follows:

1. A tool for enabling the cutting of an exceptionally straight line on a wooden board or the like to be used with a table cutter of a type having a flat table-surface on which a board to be cut rests, a cutting element positioned at said table-surface for cutting said board resting on said table-surface and a straight, vertically upwardly extending, table-surface guide at a position on said table-surface offset from said cutting element against which a first edge of said board is slid while said board is being cut, said tool comprising:

an elongated guide clamp for clamping onto a first edge portion of a board to be cut, said guide clamp having an elongated straight edge extending parallel with the location of said cut to be made to be slid along said table-surface guide, said guide clamp being channel-shaped to receive said first edge of said board to be cut with a portion of said guide clamp extending above said board and a portion extending below said board, said guide clamp including clamping member means for clamping said board in said channel, the portion of said guide clamp extending below said board being flat and smooth on its bottom surface and having a certain thickness for resting on said table-surface to thereby support the first edge of said board to be cut a certain distance above said table surface, said elongated straight edge being positioned laterally beyond said first edge of said board so that said board can be slid across the surface of said table-surface to bring said straight edge into contact with said vertically-upwardly extending table-surface guide and slid across said table with said straight edge in contact with said table-surface guide so as to move said board parallel to said table-surface guide; and, a separate shim means also having said certain thickness to be positioned independently from said guide clamp laterally intermediate said table-surface guide and said cutting element, between the table-surface and the bottom of said board, at a second, opposite, board edge portion to support the opposite edge portion of said board said certain distance above the table-surface to thereby hold said board level as it is being slid across the table-surface for cutting by said cutting element.

2. A tool as in claim 1 wherein said guide clamp is U-shaped in cross-section having a top arm means and a bottom arm, said clamping member means being mounted on said top arm for clamping said board against the inside surface of said bottom arm.

3. A tool as in claim 1 wherein said clamping member means comprises threaded shafts engaging threaded holes in said top arm means.

4. A tool as in claim 3 wherein said clamping member means includes a single pad rotatably engaged with a plurality of threaded shafts for contacting said board.

5. A tool as in claim 1 wherein said shim means has attached at a bottom surface at one end thereof a stop to engage one edge of said table.

6. A tool as in claim 5 wherein said shim means further includes engaging means for attaching said shim to said table on opposite sides of said table.

7. A tool as in claim 6 wherein said engaging means comprises a pressure responsive fastener.

8. A tool as in claim 1 wherein said shim is held on said table surface by means of screws.

9. A tool as in claim 8 wherein said screws engage holes in said table which are holes normally used for screws to hold another member to said table surface.

10. A tool as in claim 1 wherein said clamping member means comprises rotary cams which rotate about shafts mounted at said portion extending above said board.

11. A tool as in claim 1 wherein said shim means includes a magnetic material for attracting said table surface and thereby adhering thereto.

12. A tool as in claim 1 wherein said portion of said elongated guide clamp extending above said board comprises a plurality of brackets which are attached to the portion which extends below said board.

13. A tool as in claim 1 wherein said shim means includes an attaching means for attaching said shim means to said table.

14. A tool as in claim 13 wherein said shim means has attached at one end thereof a stop to engage one edge of said table.

* * * * *